(No Model.)
F. J. PATTEN.
ELECTRIC MOTOR.
No. 418,654. Patented Dec. 31, 1889.
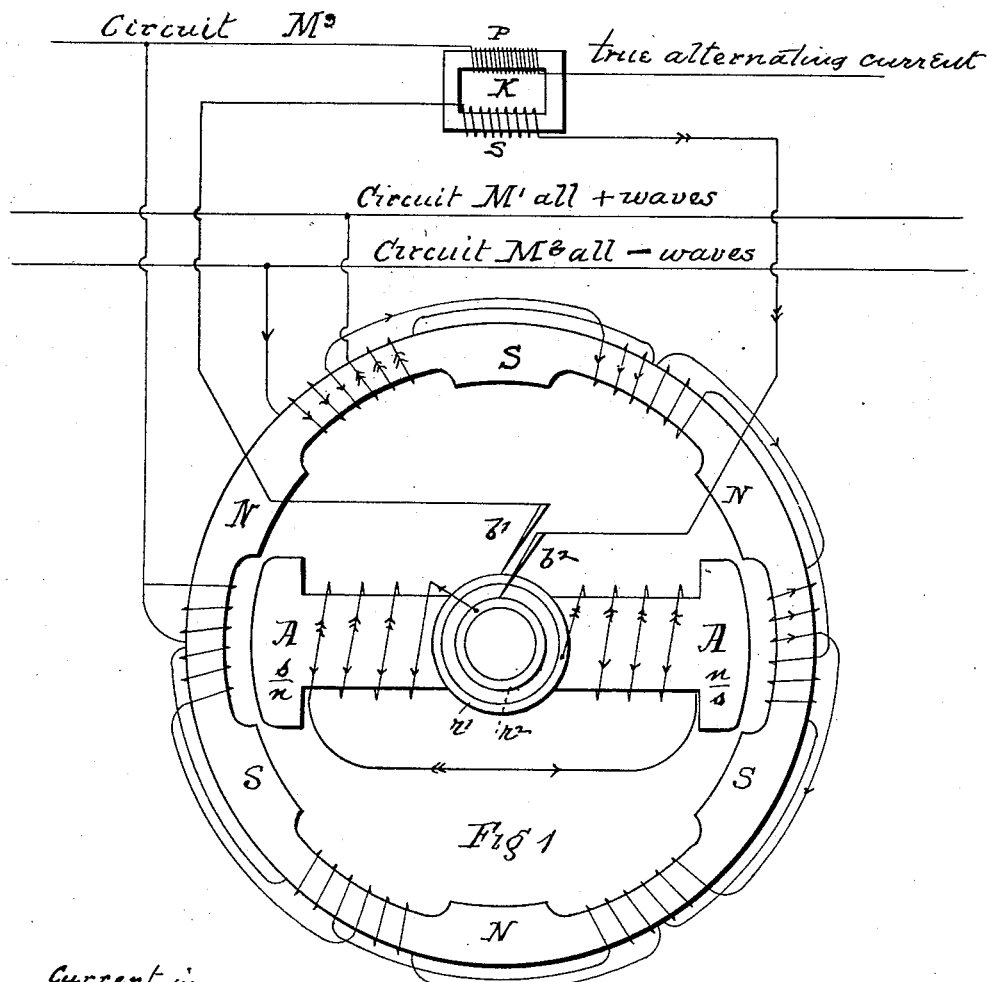
Fig. 1.
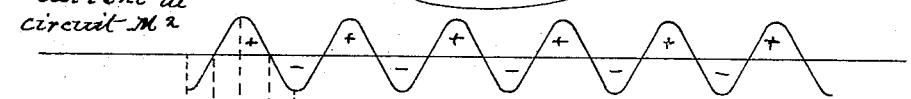
Fig. 2.
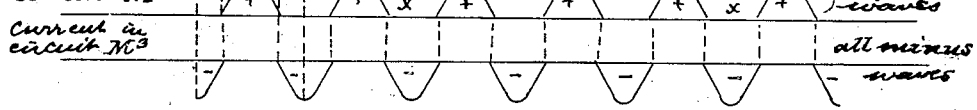
WITNESSES: Edward B Ives
INVENTOR: Francis Jarvis Patten

UNITED STATES PATENT OFFICE.

FRANCIS JARVIS PATTEN, OF NEW YORK, N. Y.

ELECTRIC MOTOR.

SPECIFICATION forming part of Letters Patent No. 418,654, dated December 31, 1889.

Application filed November 11, 1889. Serial No. 329,963. (No model.)

*To all whom it may concern:*

Be it known that I, FRANCIS JARVIS PATTEN, a citizen of the United States, residing in the city of New York, in the county and State of New York, have invented certain new and useful Improvements in Electric Motors, of which the following is a description.

Figure 1 shows by diagram the operative parts and circuits of the machine and its connections to the mains supplying current. Fig. 2 indicates by diagram the current phases in different circuits.

In former applications filed November 9, 1889, Serial No. 329,775, and November 11, 1889, Serial No. 329,962, I have described a system of generation and distribution of electric currents on a four-wire and also a three-wire double-circuit system, in which one circuit received all the plus impulses and the other all the minus impulses of an alternating current. Thus the current in one circuit would be represented by the inclosed spaces above the line X X in Fig. 2, and the current in the other circuit would be represented by the intermediate closed spaces below the line X X in the same figure. In such systems of distribution the mains $M'$ and $M^2$ convey one all the plus waves and the other all the minus waves of an alternating current. Another main $M^2$ serves as a common return for both the others and conveys a true alternating current. It may, therefore, be connected to the primary P of a converter K, and in its secondary circuit there will be a true alternating current of low tension. The motor has separate field and armature circuits.

The armature A A may be of any form, and the two terminals of the armature-circuit are brought to two continuous sliding ring-contacts $r'$ $r^2$, upon which bear the two brushes $b'$ $b^2$, and as these brushes are connected to the secondary circuit of the converter the armature-circuit is thus supplied with a low-tension alternating current, and the armature-poles N S are therefore rapidly reversed.

The field-magnets have two exciting-circuits independent of each other. One is taken from the main $M'$, conveying the plus impulses, and the other is taken from the main $M^2$, conveying the minus impulses, and both return to the main $M^2$. These two circuits are wound upon the field in opposite directions, so that the plus impulses of one circuit produce in the field-poles the same polarity as the minus impulses from the other circuit. We therefore have a field of constant polarity whose poles are alternately N and S around the circle, and with an alternating armature polarity, as previously described, the armature will revolve from one pole of the field to the next at each alternation of current, and we will therefore have a true alternating-current electric motor similar to a direct-current machine, but without a commutator.

It is evident that the machine is reversible in form—that is, either magnetic element may be provided with the double winding and the other with the single winding, and I do not restrict my invention to the form shown, as an alternating field with an armature of constant polarity would be equally operative.

Having thus described my invention, what I claim, and desire to secure by Letters Patent, is the following:

1. The method of operating electric motors which consists in producing the constant magnetization of one element by sending through separate windings on said element the opposite impulses of an alternating current in opposite directions, and in giving to the other element an alternating polarity by sending through its windings an alternating current.

2. In a system of electric distribution for the operation of electric motors, the combination of leads conveying separately the positive and negative impulses of current, and connected to separate coils conveying the currents in opposite directions on one element of the motor to produce a constant magnetization thereof, and a circuit conveying an alternating current to coils on the other element of the motor.

3. An electric motor provided with two magnetic elements, one of which is wound with two coils conveying, respectively, the positive and negative impulses of an alternating current in such a way as to produce a constant magnetization thereof, and the other element wound with a coil conveying an alternating current.

4. The method of operating electric motors which consists in sending through one of two windings of one element of an electric motor the positive and through the other the negative impulses of an alternating current, and in sending through the single winding of the other element both impulses of the alternating current.

5. An electric motor provided with two armature-circuits, one of which conveys all the positive and the other all the negative impulses of an alternating current, and a field-circuit supplied with an alternating current.

In testimony that I claim the foregoing as my invention I have hereunto set my hand, this 9th day of November, 1889, in the presence of two witnesses.

FRANCIS JARVIS PATTEN.

Witnesses:
W. M. MINER,
GEORGE KOHLMANN.